United States Patent
Asher

(10) Patent No.: US 10,789,246 B2
(45) Date of Patent: Sep. 29, 2020

(54) DATA CLUSTERING TO REDUCE DATABASE FOOTPRINT AND PROCESSING TIME

(71) Applicant: Target Brands, Inc., Minneapolis, MN (US)

(72) Inventor: Ralph Asher, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 267 days.

(21) Appl. No.: 15/842,516

(22) Filed: Dec. 14, 2017

(65) Prior Publication Data

US 2018/0181615 A1    Jun. 28, 2018

Related U.S. Application Data

(60) Provisional application No. 62/438,093, filed on Dec. 22, 2016.

(51) Int. Cl.
| | | |
|---|---|---|
| *G06F 16/2453* | (2019.01) | |
| *G06F 16/901* | (2019.01) | |
| *G06F 16/22* | (2019.01) | |

(52) U.S. Cl.
CPC ........ *G06F 16/2453* (2019.01); *G06F 16/22* (2019.01); *G06F 16/9024* (2019.01)

(58) Field of Classification Search
CPC combination set(s) only.
See application file for complete search history.

(56) References Cited

U.S. PATENT DOCUMENTS

| | | | | |
|---|---|---|---|---|
| 8,561,184 | B1* | 10/2013 | Marsa | H04L 67/22 726/22 |
| 2017/0206276 | A1* | 7/2017 | Gill | G06F 16/285 |
| 2018/0173755 | A1* | 6/2018 | Xia | G06F 16/24537 |
| 2018/0270933 | A1* | 9/2018 | Hu | H04L 41/12 |

OTHER PUBLICATIONS

"Computational complexity theory," Available on or before Jan. 1, 2004, via Internet Archive: Wayback Machine URL<https://web.archive.org/web/20170115182124/https://en.wikipedia.org/wiki/Computational_complexity_theory, [Retrieved on Dec. 13, 2017], Retrieved from: URL<https://en.wikipedia.org/wiki/Computational_complexity_theory#intractability, 15 pages.

"Core-based statistical area," Available on or before Jul. 29, 2014, via Internet Archive: Wayback Machine URL<https://web.archive.org/web/20140729131354/https://en.wikipedia.org/wiki/Core-based_statistical_area, [Retrieved on Dec. 13, 2017], Retrieved from: URL<https://en.wikipedia.org/wiki/Core-based_statistical_area, 4 pages.

(Continued)

*Primary Examiner* — Shyue Jiunn Hwa
(74) *Attorney, Agent, or Firm* — Fish & Richardson P.C.

(57) ABSTRACT

In a processing time, a dense graph is received, nodes of the dense graph are clustered using the first parameter to generate a sparse graph, a weight for each edge of the sparse graph is assigned; and the weights are stored in computer memory for use in a run time. In the run time after the processing time, a request for a weight of an edge between two first nodes of the dense graph is received, using a weight stored in computer memory, an approximated weight for the request is found and returned.

20 Claims, 10 Drawing Sheets

(56) References Cited

OTHER PUBLICATIONS

"Euclidean Distance," Available on or before Dec. 19, 2003, via Internet Archive: Wayback Machine URL<https://web.archive.org/web/20031219193019/https://en.wikipedia.org/wiki/Euclidean_distance, [Retrieved on Dec. 13, 2017], Retrieved from: URL<https://en.wikipedia.org/wiki/Euclidean_distance, 2 pages.

"How can we choose a "good" K for K-means clustering?," Retrieved on Dec. 13, 2017, Retrieved online from: URL<https://www.quora.com/How-can-we-choose-a-good-K-for-K-means-clustering, 6 pages.

"List of core-based statistical areas," Available on or before Apr. 10, 2017, via Internet Archive: Wayback Machine URL<https://web.archive.org/web/20170410074810/https://en.wikipedia.org/wiki/List_of_core-based_statistical_areas, [Retrieved on Dec. 13, 2017], Retrieved from: URL<https://en.wikipedia.org/wiki/List_of_core-based_statistical_areas, 47 pages.

"Medoid," Available on or before Dec. 19. 2003, via Internet Archive: Wayback Machine URL<https://web.archive.org/web/20120223121756/%20https://en.wikipedia.org/wiki/Medoid, [Retrieved on Dec. 13, 2017], Retrieved from: URL<https://en.wikipedia.org/wiki/Medoid, 3 pages.

"Microsoft R Application Network," Available on or before Jan. 15, 2016, via Internet Archive: Wayback Machine URL<https://web.archive.org/web/20160314113419/https://mran.microsoft.com/, [Retrieved on Dec. 13, 2017], Retrieved from: URL<https://mran.microsoft.com/, 2 pages.

"Partitioning around medoids," Available on or before Apr. 1, 2004, via Internet Archive: Wayback Machine URL<https://web.archive.org/web/20150327025131/https://stat.ethz.ch/R-manual/R-devel/library/cluster/html/pam.html, [Retrieved on Dec. 13, 2017], Retrieved from: URL<https://stat.ethz.ch/R-manual/R-devel/library/cluster/html/pam.html, 4 pages.

\* cited by examiner

| Dense Source Node | Sparse Source Node | Dense Destination Node | Sparse Destination Node | Sparse Weight |
|---|---|---|---|---|
| A | A | M | G | 9 |
| B | A | M | G | 9 |
| C | A | M | G | 9 |
| D | B | M | G | 7 |
| E | B | M | G | 7 |
| F | B | M | G | 7 |
| G | B | M | G | 7 |
| H | A | M | G | 7 |
| A | A | N | G | 9 |
| B | A | N | G | 9 |
| C | A | N | G | 9 |
| D | B | N | G | 7 |

FIG. 7

| 802 Sparse Node | 804 Sparse Node | 806 Weight |
|---|---|---|
| A | A | 0 |
| B | A | 2 |
| C | A | 6 |
| D | A | 5 |
| E | A | 3 |
| F | A | 4 |
| G | A | 7 |
| H | A | 7 |
| A | B | 8 |
| B | B | 1 |
| C | B | 2 |
| D | B | 3 |

DATA CLUSTERING TO REDUCE DATABASE FOOTPRINT AND PROCESSING TIME

CROSS-REFERENCE TO RELATED APPLICATIONS

This application claims the benefit of priority to U.S. Provisional Application Ser. No. 62/438,093, filed Dec. 22, 2016, which is considered part of (and is incorporated here by reference in) the disclosure of this application.

The present document relates to computer systems including database structures configured to improve processing efficiency.

BACKGROUND

Computers are devices that can be instructed to carry out sets of arithmetic or logical operations. Many computers use hardware configured to follow a sequence of operations, often called a program. Most programs receive input data, process the data, and provide output data. This processing can range from simplistic to very complicated. The time needed to process the data is often a function of the size of the input data and the complexity of the program. If a more complex program can be replaced with a less complex program, that time is often decreased.

SUMMARY

This document generally describes technology for database structures usable, for example, in a shipping or transmission modeling system. For example, the computer system can be configured to interact with one or more client computers running applications that generate shipping plans. The computer system can use the improved database structure (described below) to store location data, shipping costs, shipping options, and the like. In some embodiments described herein, a dense graph repressing a shipping network can be converted into a sparse graph of clustered nodes. Weights of edges in the sparse graph can be used as approximations of edges in the dense graph.

In one implementation, an innovative aspect of the subject matter described in this specification can be embodied in methods performed by data processing apparatuses. The methods may comprise in a processing time: receiving a dense graph containing a plurality of first nodes connected with first edges, each first node having a value for a first parameter; clustering nodes of the dense graph using the first parameter to generate a sparse graph containing a plurality of second nodes connected with second edges, each second node having a value for the first parameter; assigning a weight for each second edge of the sparse graph; and storing the weights in computer memory for use in a run time. The methods may optionally further include in the run time after the processing time: receiving a request for a weight of an edge between two first nodes of the dense graph; using a weight stored in computer memory to identify an approximated weight for the request for a weight of an edge between two first nodes of the dense graph; and returning the approximated weight in response to receiving the request for a weight of an edge between two first nodes of the dense graph.

In a second implementation, the subject matter described in this specification can include non-transitory computer storage media is encoded with computer program instructions that, when executed by one or more processors, cause a computer device to perform a set of operations. For example, the instructions, when executed by the one or more processors, can cause a computer device to perform operations comprising, in a processing time: receiving a dense graph containing a plurality of first nodes connected with first edges, each first node having a value for a first parameter; clustering nodes of the dense graph using the first parameter to generate a sparse graph containing a plurality of second nodes connected with second edges, each second node having a value for the first parameter; assigning a weight for each second edge of the sparse graph; and storing the weights in computer memory for use in a run time. Optionally, the operations may further include, in the run time after the processing time: receiving a request for a weight of an edge between two first nodes of the dense graph; using a weight stored in computer memory to identify an approximated weight for the request for a weight of an edge between two first nodes of the dense graph; and returning the approximated weight in response to receiving the request for a weight of an edge between two first nodes of the dense graph.

In a third implementation, a system may include one or more processors configured to execute computer program instructions, and a non-transitory computer storage media encoded with computer program instructions that, when executed by the one or more processors, cause a computer device to perform particular operations. For example, the computer storage media of the system can include the instructions that, when executed by the one or more processors, can cause the computer device to perform operations comprising, in a processing time: receiving a dense graph containing a plurality of first nodes connected with first edges, each first node having a value for a first parameter; clustering nodes of the dense graph using the first parameter to generate a sparse graph containing a plurality of second nodes connected with second edges, each second node having a value for the first parameter; assigning a weight for each second edge of the sparse graph; and storing the weights in computer memory for use in a run time. Optionally, the operations may further include, in the run time after the processing time: receiving a request for a weight of an edge between two first nodes of the dense graph; using a weight stored in computer memory to identify an approximated weight for the request for a weight of an edge between two first nodes of the dense graph; and returning the approximated weight in response to receiving the request for a weight of an edge between two first nodes of the dense graph.

Implementations can optionally include any, all, or none of the elements described above or the elements described in further detail below. Storing the weights in computer memory for use in a run time may comprise (in some implementations) for each second edge, recording in computer memory the assigned weight with an index that is based on the second nodes connected by the second edge. Also, using a weight stored in computer memory to identify an approximated weight to the request for a weight of an edge between two first nodes of the dense graph may optionally comprise: looking up the weight in the computer memory using a combination of second nodes. Assigning a weight for each edge of the sparse graph may comprise (in some implementations): for pairs of first nodes, recording in computer memory a weight assigned to a second edge connecting second nodes corresponding to the pair of first nodes. Using a weight stored in computer memory to identify an approximated weight to the request for a weight of an edge between two first nodes of the dense graph may optionally comprise: looking up the weight in the computer memory using a combination of second nodes. The first edges of the dense graph can fully connect the first nodes of the dense graph. In particular cases, some pairs of the first nodes of the dense graph have no connecting first edges. In some of the above-described implementations, a first subset of the first nodes are of a first type; a second subset of the first nodes are of a second type; and each first edge connects a first node of the first type to a first node of the second type. In some cases, the first type is a sending type; the second type is a receiving type; and the weights represent a metric for shipping an item from a first node of the sending type to a first node of the receiving type. Optionally, the metric is one of the group consisting of a cost and a delay. In particular cases, the first type is a transmission type; the second type is a reception type; and the weights represent a metric for transmission of data from a first node of the transmission type to a first node of the reception type. In such cases, the metric can be one of the group consisting of a cost and a delay. Optionally, assigning a weight for each second edge of the sparse graph may comprise: determining the weight using the values of the first parameter for the second nodes of the second edge. In some implementations, the first parameter is a location; and determining the weight comprises calculating a distance. In particular implementations, the first parameter is a location; and determining the weight comprises calculating a shipping cost. In further implementations, the first parameter is a location; a first subset of the first nodes are of a first type; a second subset of the first nodes are of a second type; and first nodes of the first type and first nodes of the second type have overlapping locations.

The systems and processes described here may be used to provide one or more of the following optional benefits. First, some embodiments of the system can be configured to provide approximate answers to queries in less time than it would take to find an exact answer. Second, particular embodiments of the system can require less computer memory space to store data. Third, particular embodiments of the system can produce approximate answers to queries in less time than is needed to produce perfectly accurate answers to queries.

Other features, aspects and potential advantages will be apparent from the accompanying description and figures.

DESCRIPTION OF DRAWINGS

FIG. 7 is a schematic diagram of an example sparse graph and dense graph stored in a computer readable memory.

FIG. 8 is a schematic diagram of an example dense graph stored in a computer readable memory.

Like reference symbols in the various drawings indicate like elements

DETAILED DESCRIPTION

Computer systems use databases to store data for current or future use. This data may be represented in various ways, and these representation choices can impact computer efficiency such as the memory footprint used by the database or the computing efficiency of applications that use the database.

This document describes a scheme for database storage in which data is stored in a graph with nodes and edges. For very large graphs, the number of edges can increase quickly as the number of nodes increase. This increase can lead to unmanageably large memory and processor requirements. To control the size of these graphs in the database, the number of nodes may be reduced by clustering nodes based on some parameter that is known to influence the weight of edges between nodes.

For example, if the nodes represent geographic locations and the weights represent transmission or shipping delay between nodes, the nodes may be clustered based on geographic area. That is, a cluster of geographically similar nodes may be represented by a single node. Edges that connect the clustered nodes to other nodes in the graph can be represented by fewer edges that connect the new node to other new nodes. In many instances, use of these kinds of techniques can result in approximate weights that can be used in place of the actual weights. Depending on the application, this approximation may be similar enough to provide useful results.

Figure 1:
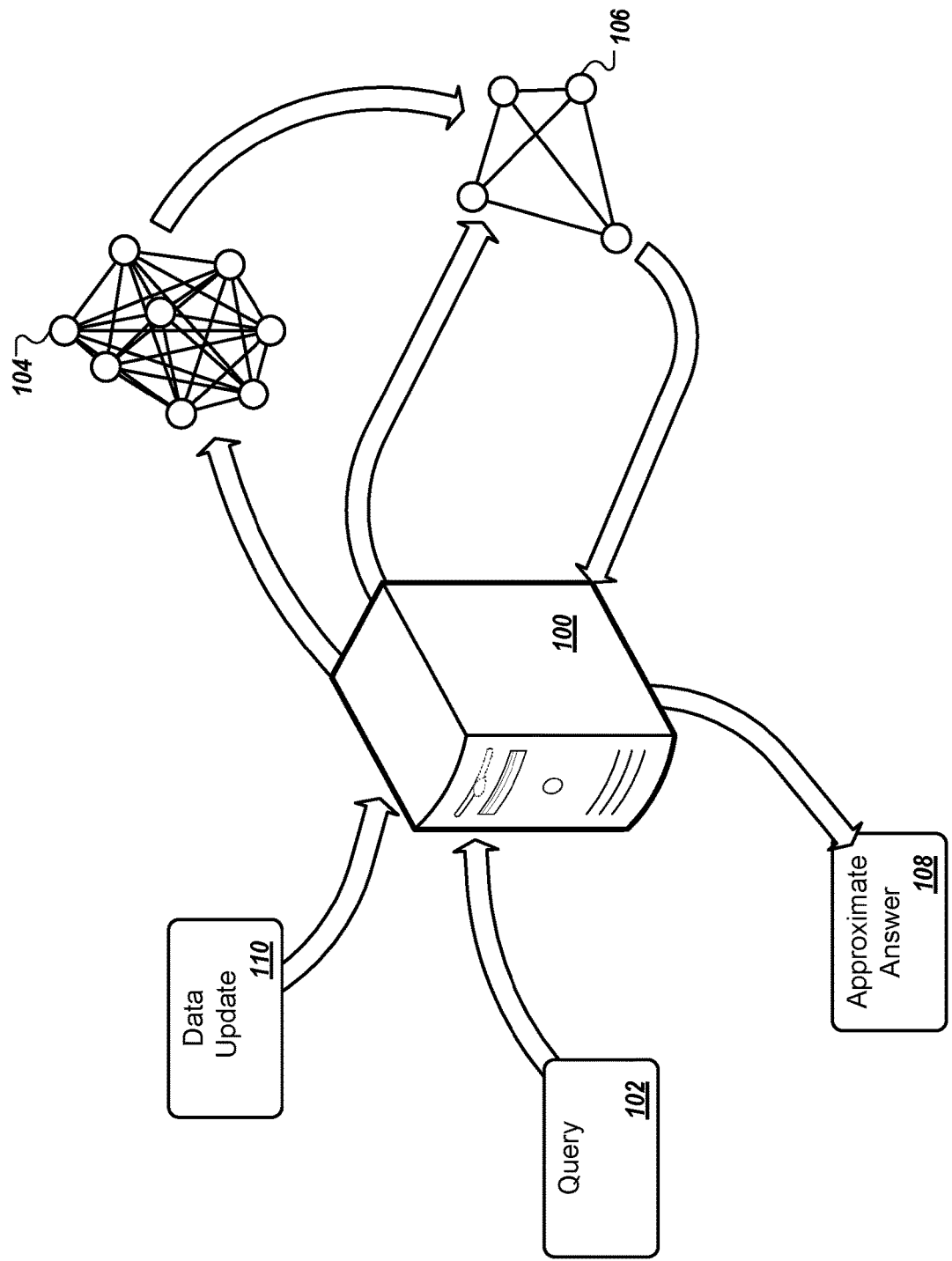
FIG. 1 is a schematic diagraph of a computer system that uses a sparse graph to approximate a response to a query that calls on data from a dense graph.

Referring to FIG. 1, some embodiments of a computer system 100 may be configured to receive a query 102 that calls on data from a dense graph 104. To respond, the computer system 100 can use a sparse graph 106 to generate an approximate answer 108 for the query 102. The computer system 100 is configured to store data and is able to respond to queries or other requests. Examples of the computer system 100 include but are not limited to one or more servers, clusters, data centers, desktop computers, or virtual machines. The query 102 may be a request from the computer system 100 itself or another computer system (e.g., a remote computer system), and the approximate answer 108 may be sent back to the requesting computer system or to yet another computer system.

For example, the computer system 100 may be a server that is connected to one or more client computers. These client computers may, for example, run applications or host webpages that use data from the dense graph 104. In some implementations, the client computers may run applications that generate shipping plans, and the computer system 100 may store location data, shipping costs, shipping options, etc. in the dense graph 104. In some implementations, the client computers may run data-network routing applications that generate routing tables, and the computer system 100 may store data about a data network.

In many such applications, the dense graph 104 may be too large to process efficiently. For example, some applications may have freshness requirements that specify that the query 102 must be responded to within a predefined amount of time. However, if the dense graph 104 is too large (e.g., has too many nodes and too many edges), the computer system 100 may not have the resources to process the query 102 within that time window. However, that same computer system 100 may be able to process a smaller graph (e.g., fewer nodes and edges) within the predefined amount of time. In such a case, the dense graph 104 may be represented by the sparse graph 106, and the sparse graph 106 may be used to process the query 102 within the predefined amount of time or other time window. In some implementations, because the sparse graph 106 is a lower-information representation of the dense graph 104, the answer 108 may be an imperfect or approximate answer, yet the answer 108 may be sufficiently accurate in a variety of applications (e.g., wherein the loss of precision is acceptable in exchange for faster processing speed).

For example, a shipping or data-routing application may only expect a parcel or packet to be in transit for a few days or a few seconds, and the transit time may be affected by events that last less than a day. A perfectly accurate answer that takes a week to receive would be of less use than an approximate answer that is available in seconds. In some examples, a shipping network may be made of warehouses and receiving stations which are represented by nodes in the dense graph 104 and in the sparse graph 106. The cost, distance, or shipping delay between these nodes may be represented by edges. In such an example, a congestion-related shipping delay may impact the shipping network for a few hours. If a query 102 needs a day or a week to process, a perfect answer may be of no use, while an approximate answer that gives, for example, a third-best-possible route in seconds may be of much more value.

To reflect the fact that some of the values of phenomena modeled by the graphs 104 and 106 can change (e.g., due to weather, congestion, or time of day), the computer 110 can receive a data update 110. For example, a weather tracking system may identify a severe weather condition, and the computer system 100 or another computer system can create a data update 110 that increases the cost or delay of data transmission to and from routers in the affected area. In another example, a data-network operator changes the price charged for transmitting data, and the computer system 100 can create the data update 110 with the new prices. Once received, the computer system 100 can act on the data update 110 to change values of the dense graph 104 and/or the sparse graph 106.

Figure 2:
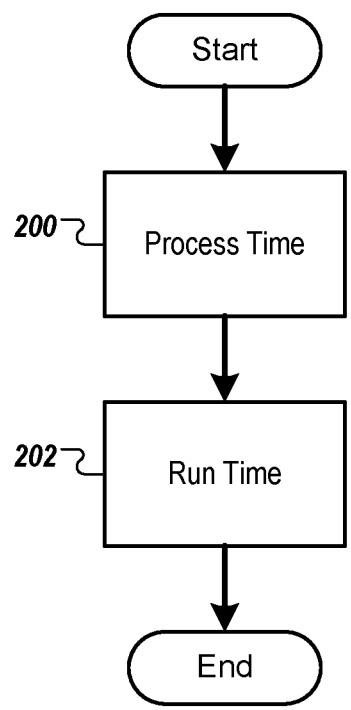
FIG. 2 is a flowchart of an example of logical time frames used by some computing systems.

Referring now to FIG. 2, a computer program or programs can include more than one 'times.' That is, the logical behavior of computer programs can be partitioned into so-called times. During different times, the computer programs and the environment in which the computer programs run can be configured to behave differently. This may be done, for example, to aid in the understanding of the program, to reduce complexity, or to account for unalterable external factors (e.g., input data only being available in some times). These times may or may not be formalized, documented, or explicitly coded into computer programs.

A process time 200 can include behavior that includes accessing some input data and processing the data in preparation for use in a run time 202. Sometimes, this is called preprocessing. A run time 202 can include behavior that includes using the preprocessed data to perform an action or solve a problem. Conceptually, the process time 200 can be thought of as getting ready, and run time 202 can be thought of as performing useful functions after being made ready. In some cases, the process time 200 is only before the run time 202. In some cases, the process time 200 and the run time 202 can overlap. For example, an application may receive a regular stream of input and may constantly act on this input. In such a case, the application may have a process time 200 component that preprocesses the data while the run time 202 performs operations on the processed data.

Computer applications that convert a dense graph is to a sparse graph may use the process time 200 and the run time 202. For example, the process time 200 could include receiving the dense graph, receiving updates to the dense graph, and generating sparse graphs from the dense graph. In the run time 202, the application may then receive a query for the dense graph and use the sparse graph to produce an approximate answer.

Figure 3:
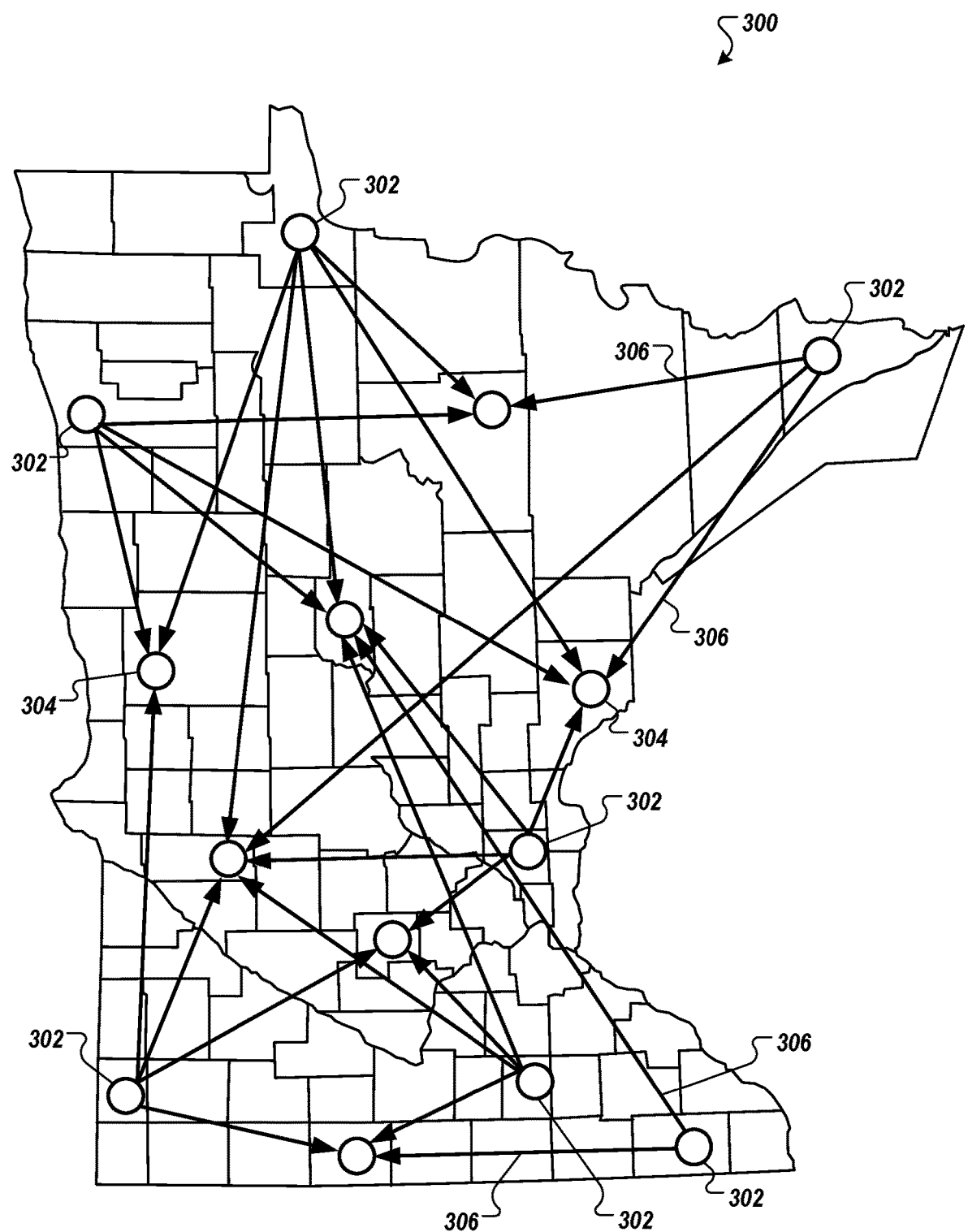
FIG. 3 is a diagram of an example of a dense graph with geographically placed nodes.

Referring now to FIG. 3, a dense graph 300 includes a group of nodes 302 and 304. Between some nodes are edges 306. A dense graph such as the dense graph 300 can be used to model a number of phenomena such as a shipping network or a data network. The following description will use the example of a shipping network, but it will be understood that other uses of graphs exist.

The dense graph 300 includes two kinds of nodes: senders 302 and receivers 304. The senders 302 can represent locations that ship parcels (e.g., warehouses holding tools or consumer goods) and the receivers 304 represent locations that receive parcels (e.g., factories using tools or stores that sell consumer goods). In some examples, nodes may exist that both send and receive items. For example, warehouses may ship items to other warehouses and stores may ship goods to other stores. In another example, many routers in data networks both send and receive data packets. As shown here, the nodes 302 and 304 overlap geographically. However, in other examples, the nodes 302 and 304 may not overlap geographically.

In some examples, the dense graph 300 may be a fully connected graph. For example, if each node 302 and 304 can ship to any other node 302 and 304, the dense graph 300 may include an edge 306 from each node 302 and 304 to every other node 302 and 304. In some examples, the dense graph 300 may include pairs of nodes 302 and 304 without any connecting edges. For example, if two warehouses exist that cannot or should not ship to each other, then there may be no edge 306 between their corresponding nodes 302.

Each node 302 and 304 may have associated data that reflects a phenomena being modeled. For example, a warehouse may have a list of items available, a geographic location, dates and times when it can ship parcels, etc. A store may have information about inventory, staffing, dates and times to receive parcels, etc.

Edges 306 are shown connecting senders 302 with receivers 304. These edges represent a value associated with the two connected nodes 302 and 304 in the direction indicated. In the shipping example, this value may be a shipping delay, a shipping cost, etc. For clarity, this description will use shipping cost only.

The dense graph 300 may be recorded in computer readable memory and used to solve problems or perform actions by computers. There are multiple ways that the dense graph 300 can be stored. For example, the nodes 302 and 304 can be stored as object-oriented objects, with node objects storing edges as, for example, pointers. A matrix may contain edge weights between nodes identified in row and column headers. A list of edges may be recorded, with each edge identifying connected nodes. An adjacency table may list every node and identify other nodes that are adjacent to that node.

This dense graph 300 may then be used by a computer program to solve problems. For example, a query may ask for the cheapest way to move a number of parcels to a list of receivers. To solve this problem, the computer may use the dense graph 300 to determine a collection of shipping events that could be undertaken at a list of senders 302 to answer this question.

However, the complexity of these kinds of problems often will greatly increase as the number of nodes 302 and 304, and as edges 306 increase. For each new node introduced to a graph, the number of possible edges increases by the number of nodes already in the graph. This growth at faster-than-linear speed can result in data sets that are too large for many computing systems to handle in a useful amount of time. However, the dense graph 300 may be processed into a data representation that is much smaller and more manageable for those computing systems. For example, the nodes 302 and 304 may be clustered to create a sparse graph 400.

Figure 4:
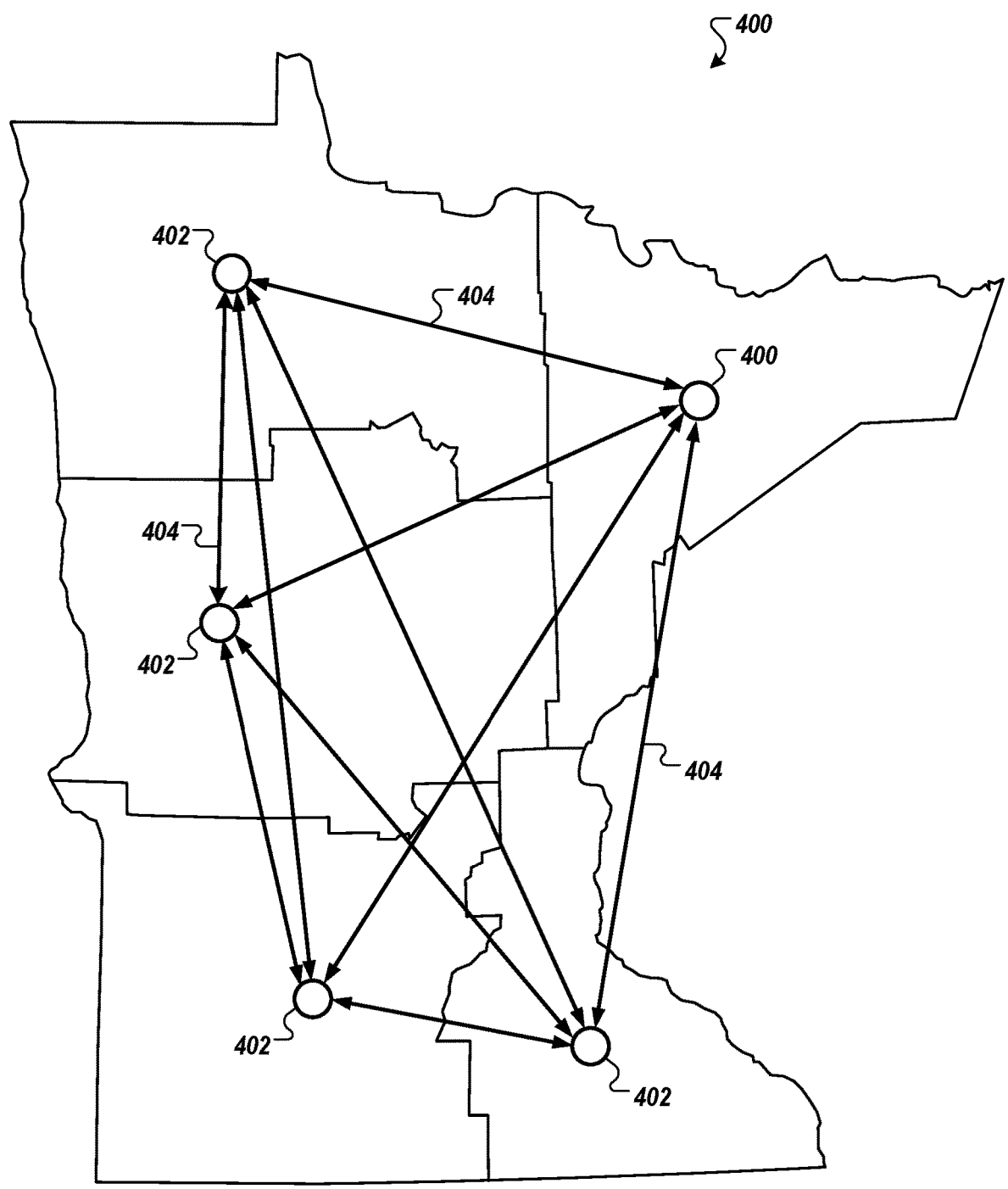
FIG. 4 is a diagram of an example of a sparse graph with geographically placed nodes

Referring to FIG. 4, the sparse graph 400 is created from the dense graph 300. The sparse graph contains nodes 402 connected by edges 404. Here, the sparse graph 400 is shown with all nodes 402 capable of being senders and receivers. In other examples, the nodes 402 may be split into senders and receivers. The nodes 302 and 304 have been clustered into nodes 402 based on a parameter, or multiple parameters, that are known or expected to influence the weighting of the edges 306. Continuing with the shipping example, geographic location (e.g., longitude and latitude position, location within a county, location within a zip code) is expected to influence shipping costs because shipping a parcel a long distance is expected to cost more than shipping the same parcel a shorter distance. As such, the nodes 302 and 304 have been clustered into the nodes 402.

To cluster based on location, the nodes may be clustered using, for example, a centroid-based clustering on location (e.g., latitude and longitude values). In centroid-based clustering, k clusters are identified, with each or many of the nodes 302 and 304 assigned to one of the k clusters. Then, each of the k clusters are represented in the sparse graph 400 with a node 402. One centroid-based clustering process is referred to as k-medoids clustering. In k-medoids clustering, given a set of nodes 302 and 304, a set of nodes 402 are found that reduces or minimizes the within-cluster distance between the nodes 302 and 304 and their representative node 402, which is selected from one of the nodes 302 and 304.

Use of k-medoids may be useful, for example, because k-medoids can use an arbitrarily dissimilarity matrix that can account for points in non-Cartesian space, as longitude and latitude are. Further, k-medoid clustering can be used to cluster around k points that are part of the original set. That allows k medoid origin points, and n medoid destination points that can be selected from the dense graph. The edges from k to n can then be selected from the dense graph to create the sparse graph. With k-means clustering (even after a geographic-to-Cartesian transformation) there is the additional step of then trying to take the cluster means and identifying an 'approximately close' node on the dense graph to use as a representative on the sparse graph.

Other clustering techniques may be used. For example, k-medians and k-means clustering, which reduces or minimizes means and medians in Cartesian space. For example, a distribution-based clustering, which identifies statistical distributions as clusters, may be used. The selection of the type of clustering may depend on, for example, the type of analysis that the sparse graph 400 will be used for, or based on features of the phenomena being modeled. For example, in an urban area where warehouses and stores exist around infrastructure features (e.g., highways, train yards), a distribution-based clustering may be selected.

In addition to the nodes 402, the sparse graph 400 can also include edges 404. In the shipping example, the edges 404 may contain weights that are calculated to determine the shipping cost of a parcel between nodes 402. These edges 404 may be used even if there is no actual warehouse at the locations associated with the nodes 402. In some configurations, the edges 404 may have weights assigned based on the nearest nodes 302 and 304. For example, if node 302a is near in location to node 402a and if node 304b is near in location to node 402b, an edge 404a may be created between nodes 402a and 402b with the same weight as the edge 306a between nodes 302a and 304b. In some configurations, the edges 404 may have weights assigned based on other calculations. For example, edges 404 may have weights assigned based on shipping cost calculations for addresses near the nodes 402.

In addition to what is described here, the clustering can also take into account information not included in the dense graph 300. For example, rules to segregate nodes for non-geographic reasons may be used in the clustering. For example, taxes, tariffs, and customs between two near-nodes may cause outsized delays or costs, and this fact can be represented with clustering rules that preclude those near-nodes from being clustered together. In another example, a computer network may require a security barrier such as an air-gap between two routers, and in this case the two routers should not be clustered. On the other hand, some nodes may have particularly low-cost connections compared to their geographic distance. For example, two cities may share a high-capacity railway or an internet backbone, and thus rules for clustering may force these nodes into the same cluster.

With the sparse graph 400 available to a computer program, the computer program can find an approximate weight of an edge between nodes in the dense graph 300. For example, to find an approximate weight of an edge 306c between nodes 302c and 304d, the computer program can find the weight of an edge 404c between nodes 402c and 402d. Since the sparse graph 400 was created by clustering on a parameter (location) of dense graph 300 expected to affect the edges 306 (shipping cost), the approximate answer from the sparse graph can be expected to be a useful approximation.

Figure 5:
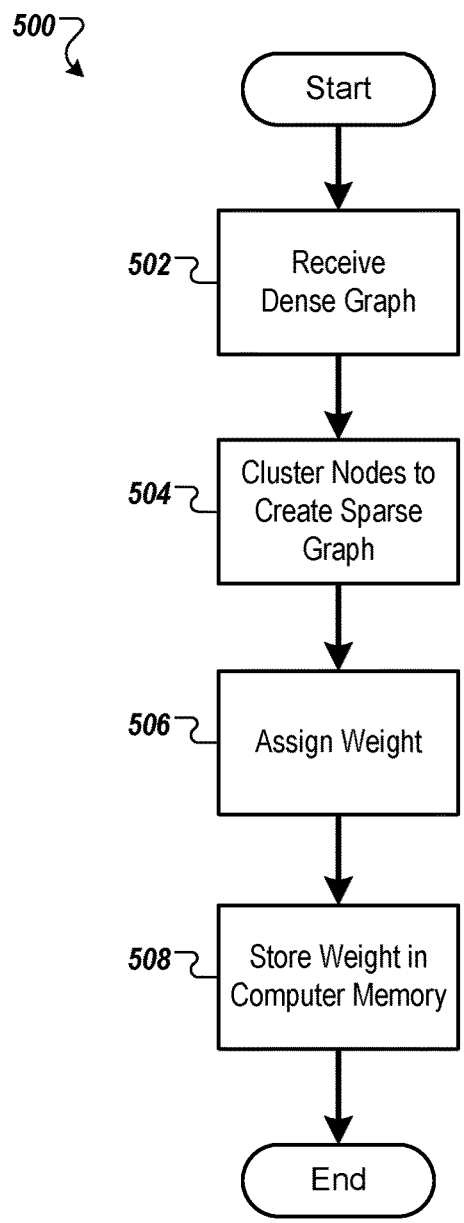
FIG. 5 is a flowchart of an example technique for building a sparse graph from a dense graph.

Referring to FIG. 5, a computer can use a technique 500 to process a dense graph into a sparse graph. The technique 500 may be used by a computing system such as the computing system 100 operating in the process time 200 with the dense graph 300 and the sparse graph 400. As such, for clarity of description, the technique 500 will be described with reference to the elements of FIGS. 1-4. However, other computing systems or other devices may use the technique 500 or a similar technique.

A dense graph is received 502. The dense graph can contain a plurality of nodes connected with edges, each node having a value for a parameter. For example, the computer system 100 can receive input about phenomena and create the dense graph 300 in processing time 200 to model the phenomena. Alternatively, the computer system 100 can receive the dense graph 300 from another computer system.

The computer system 100 can store the dense graph 300 in computer readable memory. The data needed to represent the dense graph 300 may be stored on a hard disk drive or similar long-term storage. In some cases, the dense graph 300 may not fit on the computer system 100's random access memory (RAM) or other system memory. The computer system 100 may store the entire dense graph 300 to hard disk drives, and load portions of the dense graphs 300 into RAM as needed.

Nodes are clustered to create a sparse graph 504. For example, to cluster the nodes 302 and 304 of the dense graph 300, the computer system 100 can use a parameter of the nodes 302 and 304 of the dense graph 300 to generate the sparse graph 400 containing a plurality of nodes 402 connected with edges 404, each node 402 having a value for the parameter. The computer system 100 can perform this clustering when the dense graph 300 is received, or at a predetermined time after the dense graph 300 is received. For example, the computer system 100 can cluster the dense graph 300 at regular times (e.g., nightly, once a week), in response to an external event (e.g., user input, a request from another computer system, and update to the dense graph 300), or when spare computing resources are not being used by another process.

Weights are assigned 506 to elements of the sparse graph. For example, the computer system 100 can assign weights for, for example, each node 402 and/or each edge 404, which can include using values of the parameter for the nodes 402 connected by the edge 404. In the example of shipping parcels, the computing system 100 can query a shipment management system with the two nodes 404 connected by the edge 404 to request a shipping quote. The computer system 100 can then use that shipping quote as the weight of the edge 404. In some implementations, the shipping quotes may be entered manually via a data file like a .csv file or entered in a user interface on a computer. Weights are stored in computer memory 508. For example, the stored weights may be used by the computer system 100 in run time 202. Weight values may be used to reflect shipping costs provided by parcel carriers and processing expenses at nodes such as packaging, payroll, fixed operation costs, and the like.

Figure 6:
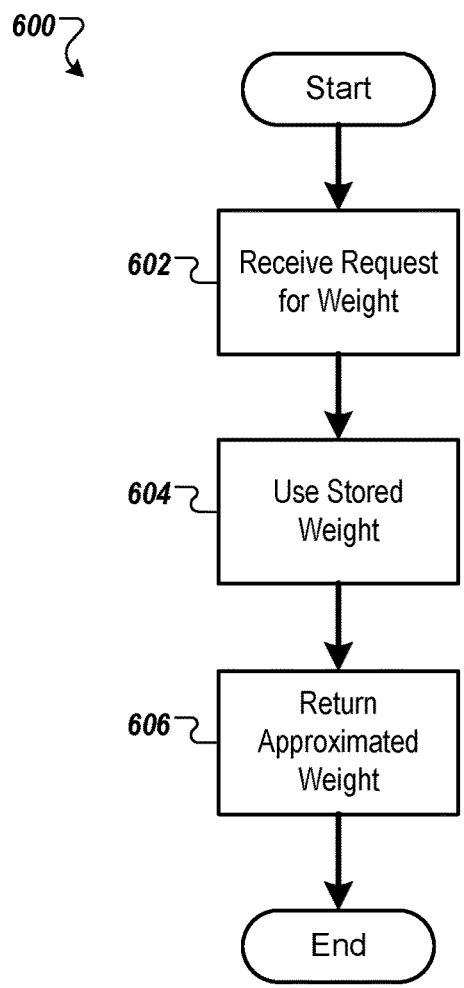
FIG. 6 is a flowchart of an example technique for using a sparse graph to generate an approximate answer.

Referring now to FIG. 6, a computer can use a technique 600 to respond to a query using a sparse graph. The technique 600 may be used by a computing system such as the computing system 100 operating in the run time 202 with the sparse graph 400. As such, for clarity of description, the technique 600 will be described with reference to the elements of FIGS. 1-4. However, other computing systems or other computing devices may use the technique 600 or a similar technique.

A request for a weight is received 602. The request can include a request for a weight of an edge 306 between two nodes 302 and 304 of the dense graph 300. For example, the computer system 100 or a client in communication with the computer system 100 can formulate a query that requests the weight between two nodes 302 and 304. This query may stand alone, or it may be used in part of a larger application. For example, a data network may be modeled by a program that attempts to estimate the round trip time (RTT) of a packet sent from one node to another. The modeling application may search through many possible routes in an attempt to identify the minimum or maximum RTT, which may require many queries to request edge weights.

A weight stored in computer memory can be used 604. The weight stored in computer memory can be used to identify an approximate weight for the request for a weight of an edge 306 between two nodes 302 and 304 of the dense graph 300. For example, the computer system 100 can receive a query that specifies an edge 306 or two node 302 and 304. From these edge and node identifier, the computer system 100 can look up a corresponding edge weight in the computer memory.

In some examples, using a weight stored in computer memory can include looking up the weight in the computer memory using a combination of nodes 402. For example, the computer system 100 may translate the request from nodes or edges of the dense graph 300 to nodes or edges of the sparse graph 400, and then can use those translated nodes or edges to look up an edge weight. In some examples, the weight of edges 404 may be stored in an index that uses nodes 302 and 304 and/or edges 306.

The approximate weight is returned 606. The approximate weight can be returned in response to receiving the request for a weight of an edge 306 between nodes 302 and 304 of the dense graph.

Referring now to FIG. 7, data 700 can contain a table of edges, nodes, and weights. The data 700 can be created and stored by computer systems to record both a dense graph and a sparse graph in a single memory structure. In the data 700, each row represents a single edge in a dense graph, and each column identifies nodes associated with that edge. The graphs recorded in the data 700 are of the type with separate source and destination nodes, wherein each edge begins with a source node and ends with a destination node. However, a similar data structure may be used for other kinds of graphs.

Columns 702 contains a listing of dense source nodes. These nodes are nodes in a dense graph that represent some kind of "source" in a phenomenon being modeled. For each dense source node, there is a corresponding dense destination node in column 706. For example, in the first row, there is a dense source node A and a dense destination node M. Thus, the dense graph contains a dense edge from node A to node M.

For the dense source nodes and dense destination nodes, there are corresponding sparse source nodes and sparse destination nodes in columns 704 and 708, respectively. These sparse nodes identify the sparse node into which the dense nodes have been clustered. For example, dense source nodes A, B, and C have been clustered into sparse source node A, and dense source nodes D, E, F, G, and H have been clustered into sparse source node B. Similarly, dense destination nodes M and N have been clustered into sparse destination node G.

Column 710 contains a sparse weight for each row. The sparse weight is calculated by finding the weight from sparse source node in column 704 to the sparse destination node in column 708.

In this example, the weight of each edge of the dense graphs is not recorded in the data 700. This may be, for example, because the cost of calculating weights between nodes is very high (e.g., may take a long time, may incur usage fees). To reduce this cost, only weights between sparse nodes is found.

The data 700 does include some redundancies. As shown, there are only two combinations of dense source and destination nodes, and the same weights are recorded many times. However, given some computing environments and task requirement, this redundancy may not pose a storage problem but may offer the ability to search for weights faster than more storage-efficient formats.

Figure 8:
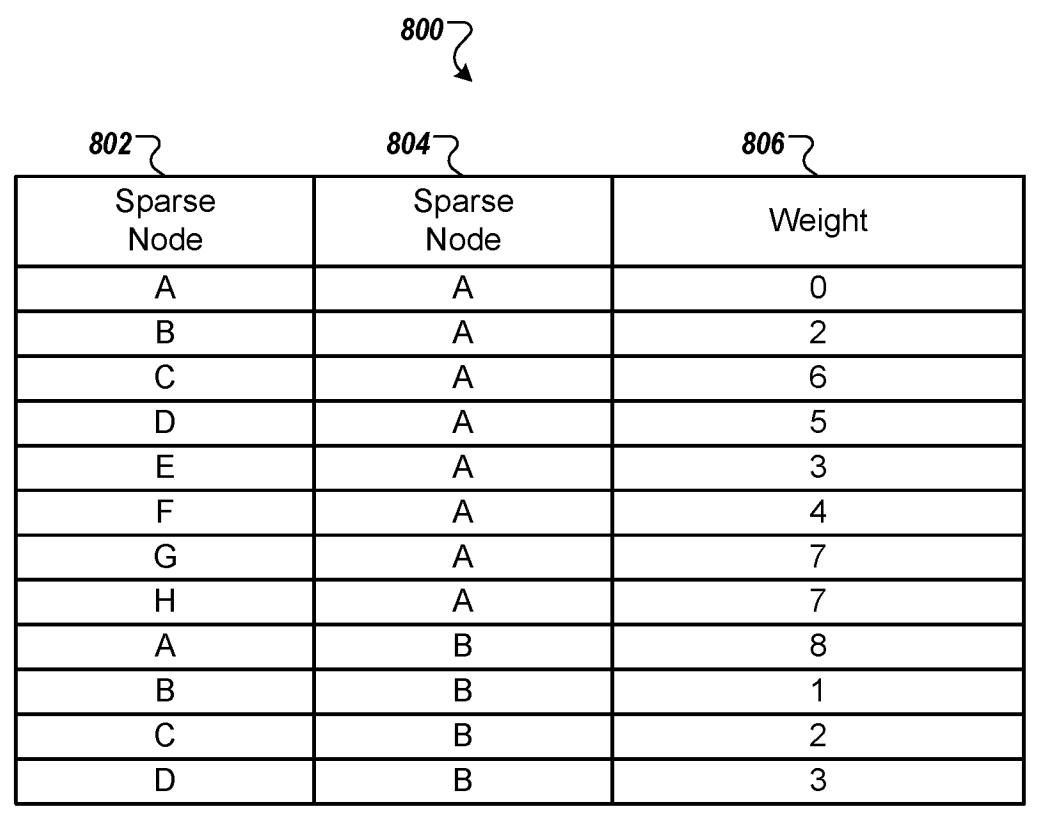

Referring now to FIG. 8, data 800 can contain a table of edges, nodes, and weights. The data 800 can be created and stored by a computer system to record a sparse graph in a memory structure. In the data 800, each row represents a single edge in a sparse graph, and each column identifies nodes associated with that edge. The graphs recorded in the data 800 are of the type without separate source and destination nodes. However, a similar data structure may be used for other kinds of graphs.

Columns 802 and 804 contain a listing of sparse nodes. These nodes are nodes in a sparse graph created from a dense graph. Column 806 contains a sparse weight for each weight. The sparse weight is calculated by finding the weight from a sparse node in column 802 to a sparse node in column 804.

Given two dense nodes, or a dense edge that identifies two dense nodes, the dense nodes can be translated into sparse nodes in order to find an approximate weight between the dense nodes using the weight in column 806. For example, if dense node A corresponds to sparse node C and dense node D corresponds to sparse node B, a weight of 2 may be found from the data 800. Then, this weight of 2 may be used as an approximate weight between the dense nodes A and D.

In FIG. 7, dense graph and sparse graph data is stored together in memory while in FIG. 8 the sparse graph data is stored separately from the dense graph data. In some implementations, storing the dense graph data separately from the sparse graph data increases computation speed. For example, when a computer system is using only dense graph data, or only sparse graph data, data access and processing speed can be increased by keeping the data separate.

By way of non-limiting example, techniques described in this document can be used to reduce complexity of a problem known as the multi-commodity flow problem. The multi-commodity flow problem is a network flow problem with multiple commodities between different source and sink nodes. Data representing commodities (e.g., products) held at various locations is recorded. For example, shoes are recorded as being held in warehouses A and B, shirts in just warehouses A and C, and pants in warehouse A, B, and C. On the receiving end are customers in locations W, X, Y, and Z, and in this example all customers have the same demand for shirts, pants, and shoes.

Because shoes, pants, and shirts in this example all have different physical weights (in oz., lbs., or kg, for example), the shipping costs from Warehouse A to any particular destination will be different for each individual product. However, if Warehouse A and B are very close to each other than the shipping cost and delay from Warehouse A for shoes will be identical (or nearly identical) to the shipping cost and delay from Warehouse B for shoes; hence Warehouse A and Warehouse B can be clustered together for the purposes of commodity flows. Similarly, if Customer Locations Y and Customer Location Z are very close to each other than we can cluster them together for the purpose of commodity flows.

This reduces the number of origin/destination/product permutations that would be possible in multi-commodity flow problem from 21 permutations to 10 permutations (replacing dense origins A and B with origin A, replacing dense destination Y and Z with destination Y, and replacing the dense edge cost with a sparse edge cost that is the average of dense edge costs). This can be used to reduces the computational complexity of solving the multi-commodity flow problem.

TABLE 1

21 Permutations

| Dense Origin | Dense Destination | Product | Dense Edge Cost |
|---|---|---|---|
| A | X | Shoes | 5.65 |
| A | Y | Shoes | 6.40 |
| A | Z | Shoes | 2.61 |
| A | X | Shirts | 7.51 |

TABLE 1-continued

21 Permutations

| Dense Origin | Dense Destination | Product | Dense Edge Cost |
|---|---|---|---|
| A | Y | Shirts | 4.74 |
| A | Z | Shirts | 4.47 |
| A | X | Pants | 3.80 |
| A | Y | Pants | 1.52 |
| A | Z | Pants | 2.28 |
| B | X | Shoes | 5.24 |
| B | Y | Shoes | 3.09 |
| B | Z | Shoes | 5.06 |
| B | X | Pants | 4.43 |
| B | Y | Pants | 4.80 |
| B | Z | Pants | 4.37 |
| C | X | Shirts | 7.57 |
| C | Y | Shirts | 6.62 |
| C | Z | Shirts | 2.30 |
| C | X | Pants | 5.51 |
| C | Y | Pants | 2.34 |
| C | Z | Pants | 4.94 |

TABLE 2

10 Permutations

| Sparse Origin | Sparse Destination | Dense Product | Sparse Edge Cost |
|---|---|---|---|
| A | X | Shoes | 5.45 |
| A | Y | Shoes | 4.29 |
| A | X | Shirts | 7.51 |
| A | Y | Shirts | 4.61 |
| A | X | Pants | 4.11 |
| A | Y | Pants | 3.24 |
| C | X | Shirts | 7.57 |
| C | Y | Shirts | 4.46 |
| C | X | Pants | 5.51 |
| C | Y | Pants | 3.64 |

Figure 9:
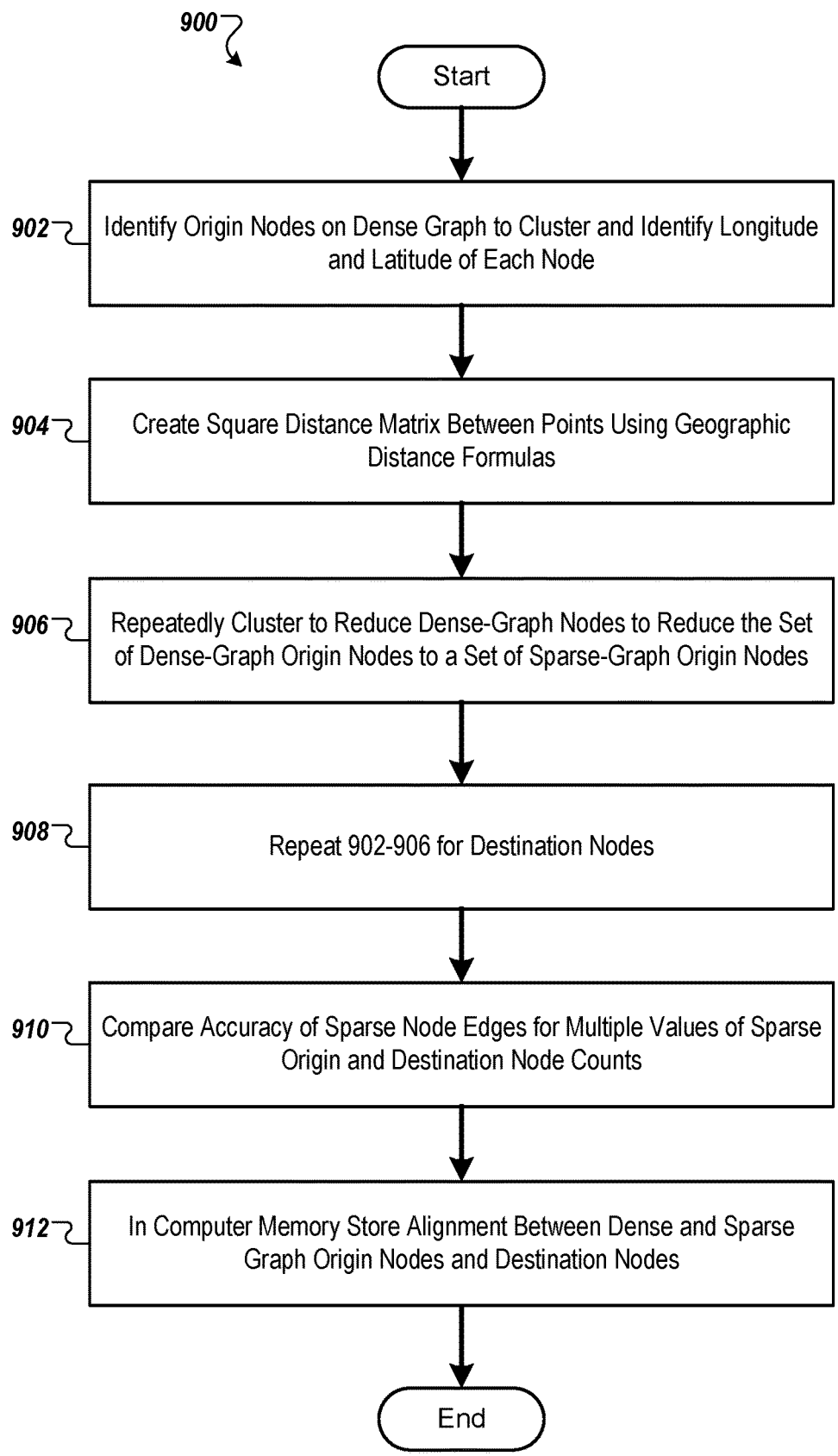
FIG. 9 is a flowchart of an example technique for creating a sparse graph from a dense graph.

FIG. 9 is a flowchart of an example technique 900 for creating a sparse graph from a dense graph. The technique 900 may be used by a computing system such as the computing system 100 operating in the process time 200 with the dense graph 300 and the sparse graph 400. As such, for clarity of description, the technique 500 will be described with reference to the elements of FIGS. 1-4. However, other computing systems or other devices may use the technique 900 or a similar technique.

Origin nodes of a dense graph are identified. Longitude and latitude for those nodes is identified (902). For example, the computer system 100 can read the dense graph 104 from memory or receive the dense graph 104 from another computer system. Origin nodes representing stores and warehouses in the dense graph 104 may have numeric values stored representing the longitude and latitude locations of the represented stores and warehouses.

A square distance matrix is created to record distances between the dense graph origin nodes (904). For example, the computing system 100 can use the Haversine distance formula to identify distances between every pair of origin node, and store those distances in a computer memory in a two dimensional matrix. For example, when using k-means clustering, latitude and longitude can be transformed into X/Y coordinates through projection onto a Cartesian plane, with the X/Y coordinates representing distance north/south and east/west of a designated point. These X/Y coordinates can then be used as Cartesian coordinates used in the k-means clustering process.

A clustering algorithm is repeatedly used to reduce the set of dense-graph origin nodes to a sparse set of $k_{origin}$ origin nodes, using different values of k clusters and assign each dense-graph origin node to a sparse graph node under each value of k clusters (906). For example, the computer system 100 can perform many iterations of this calculation to generate candidate clusters. Actions 902-906 are then repeated for destination nodes (908). For example, the computer system 100 can generate a similar set of candidate destination nodes.

Accuracy is found of sparse node edges for multiple values of sparse origin node $k_{origin}$ and multiple values of sparse destination node $k_{destination}$, as compared to the dense graph edges. The pair of sparse origin node $k_{origin}$ and sparse destination node $k_{destination}$ with the greatest reduction in edges while maintaining an acceptable approximation of the dense graph is found (910). For example, the computer system 100 can examine combinations of the candidate source and candidate destination sparse nodes and find the combination of nodes that meets these criteria. The acceptable approximation can be determined by various criteria that compare dense edge weights with sparse edge weights.

In computer memory, store the alignment between the dense graph origin nodes and sparse graph origin nodes, and dense graph destination nodes and sparse graph destination nodes (912). For example, the computer system 100 can store the selected combination of candidate nodes as the sparse graph 108

Figure 10:
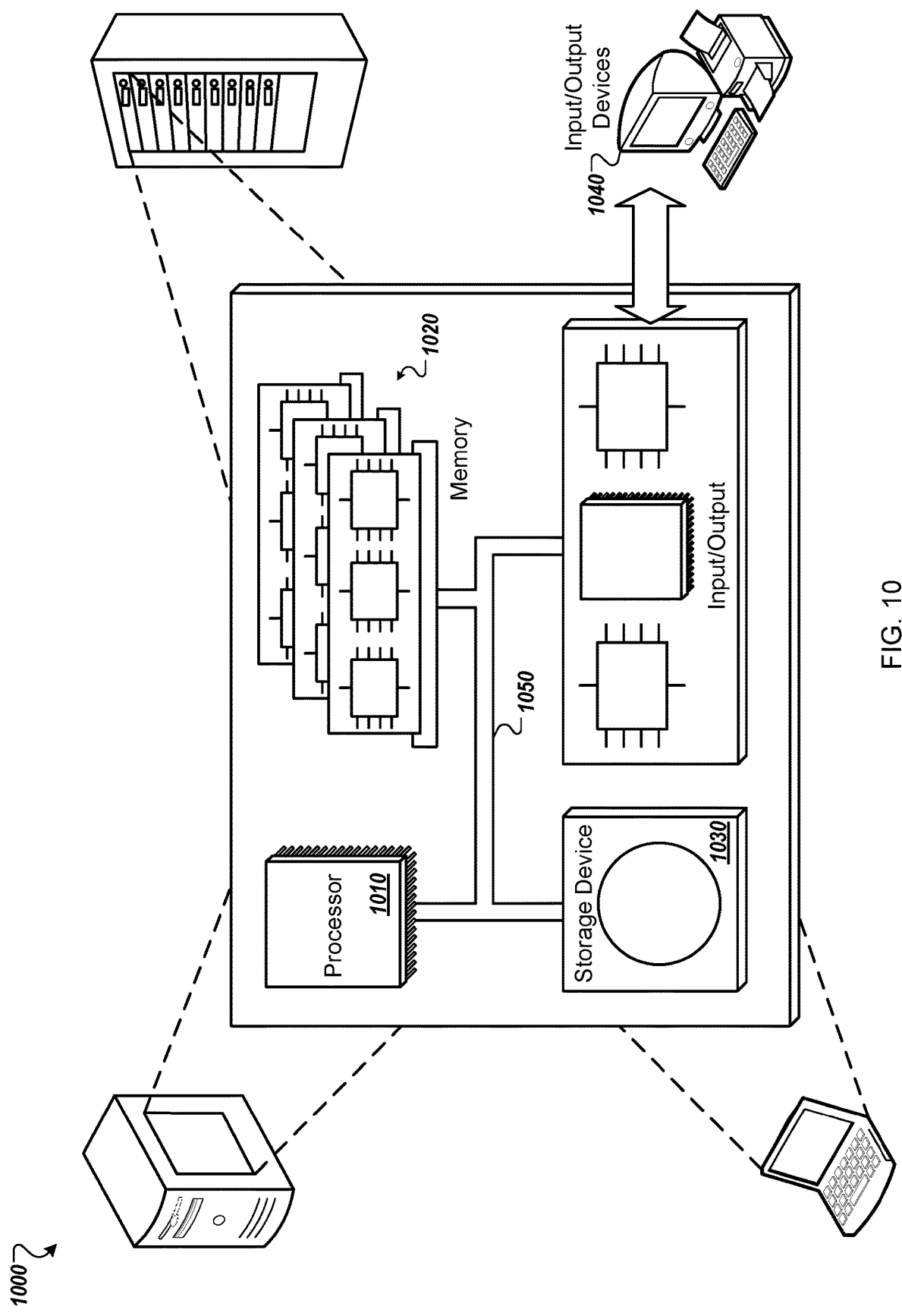
FIG. 10 is a schematic diagram that shows an example of a computing system.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provide as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth, WiFi, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone 1080. It may also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by data processing apparatuses, the method comprising:
   in a processing time:
      receiving a dense graph containing a plurality of first nodes connected with first edges, each first node having a value for a first parameter, wherein at least a subset of the first nodes are of a sending type to representing physical locations that ship parcels and wherein at least a second subset of the first nodes are of a receiving type representing physical locations that receive parcels, and wherein each first edge connects a sending-type first node to a receiving-type second node;
      clustering nodes of the dense graph using the first parameter that records geographic location information in order to generate a sparse graph containing a plurality of second nodes connected with second edges, each second node having a value for the first parameter;
      querying, for each particular second edge of the plurality of second edges of the sparse graph, a shipping management system with second nodes connected by the particular second edge, to receive a particular shipping quote for the particular second edge, the particular shipping quote being based on a shipping cost to ship items between geographic locations of the second nodes connected by the particular second edge;
      determining a particular weight for each particular second edge of the plurality of second edges of the sparse graph based on the corresponding particular shipping quote and the shipping cost calculated as part of the corresponding particular shipping quote;
      assigning the particular weight determined for each particular second edge of the plurality of second edges of the sparse graph such that a future-query received in a run time can be processed within a predefined time window; and
      storing the weights in computer memory for use in a run time; and
   in the run time after the processing time:
      receiving a request for a weight of a requested first edge between two first nodes of the dense graph;
      identifying an unrequested second edge based on the unrequested second edge serving as a geographic proxy in the sparse graph for the requested first edge in the dense graph;
      using a second edge weight from the sparse graph that is stored in computer memory in association with the unrequested second edge in the sparse graph to identify an approximated weight for the requested first edge in the dense graph; and
      returning the second edge weight from the sparse graph as an approximated weight in response to receiving the request for a weight of the requested first edge between two first nodes of the dense graph, wherein the second edge weight represents an approximate shipping cost for shipping between two physical locations represented by the two first nodes identified in the request, the second edge weight being used to generate shipping plans for, at least, the two physical locations.

2. The method of claim 1, wherein:
storing the weights in computer memory for use in a run time comprises:
   for each second edge, recording in computer memory the assigned weight with an index that is based on the second nodes connected by the second edge.

3. The method of claim 2, wherein:
using a weight stored in computer memory to identify an approximated weight to the request for a weight of an edge between two first nodes of the dense graph comprises:
   looking up the weight in the computer memory using a combination of second nodes.

4. The method of claim 1, wherein:
assigning a weight for each edge of the sparse graph comprises:
   for pairs of first nodes, recording in computer memory a weight assigned to a second edge connecting second nodes corresponding to the pair of first nodes.

5. The method of claim 4, wherein:
using a weight stored in computer memory to identify an approximated weight to the request for a weight of an edge between two first nodes of the dense graph comprises:
   looking up the weight in the computer memory using a combination of second nodes.

6. The method of claim 1, wherein the first edges of the dense graph fully connect the first nodes of the dense graph.

7. The method of claim 1, wherein some pairs of the first nodes of the sparse graph have no connecting first edges.

8. The method of claim 1, wherein: the weights represent a metric for shipping an item from a first node of the sending type to a first node of the receiving type.

9. The method of claim 8 where the metric is one of the group consisting of a cost and a delay.

10. The method of claim 1, wherein:
assigning a weight for each second edge of the sparse graph comprises:
   determining the weight using the values of the first parameter for the second nodes of the second edge.

11. The method of claim 1, wherein:
the first parameter is a location; and
determining the weight comprises calculating a distance.

12. The method of claim 1, wherein:
the first parameter is a location;
a first subset of the first nodes are of a first type;
a second subset of the first nodes are of a second type; and first nodes of the first type and first nodes of the second type have overlapping locations.

13. The method of claim 1, wherein the shipping plans are generated based on multiple requests and multiple edge weights providing multiple approximate shipping costs for different routes, including the second edge weight representing the approximate shipping cost for shipping between the two physical locations represented by the two first nodes.

14. The method of claim 13, wherein the shipping plans are generated to identify a best route based on the multiple approximate shipping costs for the different routes.

15. A non-transitory computer storage media encoded with computer program instructions that, when executed by one or more processors, cause a computer device to perform operations comprising:
    in a processing time:
        receiving a dense graph containing a plurality of first nodes connected with first edges, each first node having a value for a first parameter, wherein at least a subset of the first nodes are of a sending type to representing physical locations that ship parcels and wherein at least a second subset of the first nodes are of a receiving type representing physical locations that receive parcels, and wherein each first edge connects a sending-type first node to a receiving-type second node;
        clustering nodes of the dense graph using the first parameter that records geographic location information in order to generate a sparse graph containing a plurality of second nodes connected with second edges, each second node having a value for the first parameter;
        querying, for each particular second edge of the plurality of second edges of the sparse graph, a shipping management system with second nodes connected by the particular second edge, to receive a particular shipping quote for the particular second edge, the particular shipping quote being based on a shipping cost to ship items between geographic locations of the second nodes connected by the particular second edge,
        determining a particular weight for each particular second edge of the plurality of second edges of the sparse graph based on the corresponding particular shipping quote and the shipping cost calculated as part of the corresponding particular shipping quote;
        assigning the particular weight determined for each particular second edge of the plurality of second edges of the sparse graph such that a future-query received in a run time can be processed within a predefined time window; and
        storing the weights in computer memory for use in a run time; and
    in the run time after the processing time:
        receiving a request for a weight of a requested first edge between two first nodes of the dense graph;
        identifying an unrequested second edge based on the unrequested second edge serving as a geographic proxy in the sparse graph for the requested first edge in the dense graph;
        using a second edge weight from the sparse graph that is stored in computer memory in association with the unrequested second edge in the sparse graph to identify an approximated weight for the requested first edge in the dense graph; and
        returning the second edge weight from the sparse graph as an approximated weight in response to receiving the request for a weight of the requested first edge between two first nodes of the dense graph, wherein the second edge weight represents an approximate shipping cost for shipping between two physical locations represented by the two first nodes identified in the request, the second edge weight being used to generate shipping plans for, at least, the two physical locations.

16. The computer storage media of claim 15, wherein:
    storing the weights in computer memory for use in a run time comprises:
        for each second edge, recording in computer memory the assigned weight with an index that is based on the second nodes connected by the second edge.

17. A system comprising:
one or more processors configured to execute computer program instructions; and
a non-transitory computer storage media encoded with computer program instructions that, when executed by one or more processors, cause a computer device to perform operations comprising:
    in a processing time:
        receiving a dense graph containing a plurality of first nodes connected with first edges, each first node having a value for a first parameter, wherein at least a subset of the first nodes are of a sending type to representing physical locations that ship parcels and wherein at least a second subset of the first nodes are of a receiving type representing physical locations that receive parcels, and wherein each first edge connects a sending-type first node to a receiving-type second node;
        clustering nodes of the dense graph using the first parameter that records geographic location information in order to generate a sparse graph containing a plurality of second nodes connected with second edges, each second node having a value for the first parameter;
        querying, for each particular second edge of the plurality of second edges of the sparse graph, a shipping management system with second nodes connected by the particular second edge, to receive a particular shipping quote for the particular second edge, the particular shipping quote being based on a shipping cost to ship items between geographic locations of the second nodes connected by the particular second edge,
        determining a particular weight for each particular second edge of the plurality of second edges of the sparse graph based on the corresponding particular shipping quote and the shipping cost calculated as part of the corresponding particular shipping quote;
        assigning the particular weight determined for each particular second edge of the plurality of second edges of the sparse graph such that a future-query received in a run time can be processed within a predefined time window; and
        storing the weights in computer memory for use in a run time; and
    in the run time after the processing time:
        receiving a request for a weight of a requested first edge between two first nodes of the dense graph;
        identifying an unrequested second edge based on the unrequested second edge serving as a geographic proxy in the sparse graph for the requested first edge in the dense graph;

using a second edge weight from the sparse graph that is stored in computer memory in association with the unrequested second edge in the sparse graph to identify an approximated weight for the requested first edge in the dense graph; and returning the second edge weight from the sparse graph as an approximated weight in response to receiving the request for a weight of the requested first edge between two first nodes of the dense graph, wherein the second edge weight represents an approximate shipping cost for shipping between two physical locations represented by the two first nodes identified in the request, the second edge weight being used to generate shipping plans for, at least, the two physical locations.

18. The system of claim 17, wherein:

storing the weights in computer memory for use in a run time comprises:

for each second edge, recording in computer memory the assigned weight with an index that is based on the second nodes connected by the second edge.

19. The system of claim 17, wherein the shipping plans are generated based on multiple requests and multiple edge weights providing multiple approximate shipping costs for different routes, including the second edge weight representing the approximate shipping cost for shipping between the two physical locations represented by the two first nodes.

20. The system of claim 19, wherein the shipping plans are generated to identify a best route based on the multiple approximate shipping costs for the different routes.

* * * * *